United States Patent [19]

Bodor et al.

[11] Patent Number: 4,840,810
[45] Date of Patent: Jun. 20, 1989

[54] PROCESS FOR THE PREPARATION OF AN EDIBLE FAT-CONTAINING PRODUCT

[75] Inventors: Janos Bodor, Rijswijk; Jan van Heteren, Vlaardingen; Henricus W. Willemse, Schiedam; Leo F. Vermaas, Lijsterlaan, all of Netherlands

[73] Assignee: Lever Brothers Company, New York, N.Y.

[21] Appl. No.: 843,338

[22] Filed: Mar. 24, 1986

[30] Foreign Application Priority Data

Mar. 27, 1985 [GB] United Kingdom ................. 8508012
May 24, 1985 [NL] Netherlands ......................... 8501486

[51] Int. Cl.$^4$ ............................................. A23D 3/00
[52] U.S. Cl. ..................................... 426/312; 426/602; 426/603; 426/604; 426/656; 426/804
[58] Field of Search ............... 426/603, 604, 606, 601, 426/602, 613, 804, 312, 564

[56] References Cited

U.S. PATENT DOCUMENTS

| | | | |
|---|---|---|---|
| 2,048,286 | 7/1936 | Pease | 366/85 |
| 2,295,594 | 9/1942 | Mills | 252/134 |
| 2,434,429 | 1/1948 | Nelson | 426/603 |
| 2,525,081 | 10/1950 | Schulerud | 252/370 |
| 2,640,033 | 5/1953 | Marshall | 252/367 |
| 2,686,761 | 8/1954 | Ferguson et al. | 252/109 |
| 2,810,159 | 10/1957 | Teichmann | 425/190 |
| 2,813,302 | 11/1957 | Beck | 264/349 |
| 2,970,116 | 1/1961 | Kelly et al. | 252/368 |
| 3,089,197 | 5/1963 | Chaffee et al. | 264/50 |
| 3,174,185 | 3/1965 | Gerber | 366/99 |
| 3,434,974 | 3/1969 | Austin et al. | 252/539 |
| 3,523,909 | 8/1970 | Bradley et al. | 252/370 |
| 3,593,379 | 7/1971 | Hendry | 366/82 |
| 3,762,313 | 10/1973 | Schott | 100/92 |
| 3,779,521 | 12/1973 | Godines | 366/79 |
| 3,801,248 | 4/1974 | Fischer | 425/199 |
| 4,057,379 | 11/1977 | Sato | 425/199 |
| 4,253,771 | 3/1981 | Renk | 366/89 |
| 4,362,758 | 12/1982 | MacNeill et al. | 426/603 |
| 4,390,561 | 6/1983 | Blair et al. | 426/603 X |
| 4,419,014 | 12/1983 | Gale | 366/99 |
| 4,479,884 | 10/1984 | Clarke et al. | 252/132 |
| 4,517,107 | 5/1985 | Clarke et al. | 252/108 |

FOREIGN PATENT DOCUMENTS

| | | | |
|---|---|---|---|
| 622041 | 6/1961 | Canada | 426/603 |
| 36985 | of 0000 | European Pat. Off. | |
| 0036985 | 10/1981 | European Pat. Off. | |
| 0041403 | 12/1981 | European Pat. Off. | |

(List continued on next page.)

OTHER PUBLICATIONS

RAPTA CTM Cavity Transfer Mixer advertising leaflet.
RAPTA News, vol. 5, No. 3, p. 5 published in Autumn 1981.
RAPTA News, vol. 6, No. 1, p. 1 and p. 5, published in Spring 1982.
Applications of the Cavity Transfer Mixer to Rubber Extrusion.
Press Release by "The International Technical Centre for Rubbers and Plastics", (ITCRP) Aug. 3, 1981.
Elastomerics, Oct. 1981, p. 76/8.
Press Release, ITCRP, Jan. 6, 1982.
Plastics and Rubber Weekly, No. 919, Jan. 9, 1981, p. 1.
The Oakes Continuous Automatic Mixer.

(List continued on next page.)

Primary Examiner—Donald E. Czaja
Assistant Examiner—Celine T. Callahan
Attorney, Agent, or Firm—Matthew J. McDonald; James J. Farrell

[57] ABSTRACT

The invention concerns a process for the preparation of an edible plastified fat-containing product wherein a fat-containing composition is passed through a heat-exchanger comprising two closely spaced mutually displaceable surfaces, each having a pattern of cavities which overlap during movement of one surface with respect to the other, between which surfaces the composition passes, at least one of which surfaces is provided with means to control the temperature thereof, wherein more in particular one or both of the surfaces can act as heat exchanging surface. The surface(s) can either be heated or cooled.

25 Claims, 4 Drawing Sheets

FOREIGN PATENT DOCUMENTS

| | | |
|---|---|---|
| 0048590 | 3/1982 | European Pat. Off. . |
| 0101104 | 2/1984 | European Pat. Off. . |
| 834242 | 7/1949 | Fed. Rep. of Germany . |
| 2543 | 5/1956 | Fed. Rep. of Germany . |
| 1090183 | 3/1960 | Fed. Rep. of Germany . |
| 2151891 | 4/1973 | Fed. Rep. of Germany . |
| 1135463 | 4/1957 | France . |
| 2081796 | 12/1971 | France . |
| 0016243 | 4/1974 | Japan . |
| 59-130135 | 11/1984 | Japan . |
| 83/03222 | 9/1983 | PCT Int'l Appl. . |
| 1447435 | of 0000 | United Kingdom . |
| 727646 | 4/1955 | United Kingdom . |
| 729833 | 5/1955 | United Kingdom . |
| 787764 | 12/1957 | United Kingdom . |
| 841743 | 7/1960 | United Kingdom . |
| 843849 | 8/1960 | United Kingdom . |
| 930339 | 7/1963 | United Kingdom . |
| 935200 | 8/1963 | United Kingdom . |
| 944705 | 12/1963 | United Kingdom . |
| 723361 | 2/1965 | United Kingdom . |
| 1281628 | 7/1972 | United Kingdom . |
| 1327511 | 8/1973 | United Kingdom . |
| 1475216 | 6/1977 | United Kingdom . |
| 2034742 | 6/1980 | United Kingdom . |
| 2106407 | 4/1983 | United Kingdom . |

OTHER PUBLICATIONS

Oakes Continuous Mixer Bulletins 110, 501 and 510.
A. J. Haighton "The Measurement of the Hardness of Margarine and Fats with Core Penetrometers", JAOCS 36, (1959), 345–348.
A. J. C. Anderson, "Margarine", Pergamon Press Limited, London 1954, pp. 228–232.
J. C. van den Enden et al., "A Method for the Determination of the Solid Phase Content of Fats Using Pulse Nuclear Magnetic Resonance", Fette, Seifen, Anstrichmittel 80, (1978), 180–186.
Kirk-Othmer Encyclopedia of Chemical Technology, Second Edition, vol. 18, pp. 426–429, 432.
Buerger et al. in Proc. N.A.S., 31 (1945), pp. 226–233.
Ferguson, R. H., "Oil & Soap", Jan. 1944, pp. 6 to 9.
Ferguson, R. H. et al., "Industrial and Engineering Chemistry", 35, No. 9 (1943), pp. 1005–1012.
Bailey's Industrial Oil & Fat Products, vol. 1, 4th Ed., John Wiley & Sons, pp. 523–526.

PROCESS FOR THE PREPARATION OF AN EDIBLE FAT-CONTAINING PRODUCT

FIELD OF THE INVENTION

The present application is concerned with a process for the preparation of an edible fat-containing product.

PRIOR ART

From European patent application No. 101,104, it is known to prepare an edible oil and water containing emulsion comprising inter alia processing an oil-in-water emulsion and a separate water phase followed by mixing these phases to obtain the final emulsion.

British patent No. 1,327,511 describes mixing and emulsifying two separate process streams, one warm liquid containing crystallizable fat and a second, cold liquid containing substantially no crystallizable fat, followed by working and packing of the partially crystallized mixture. In the preparation of edible fat-containing products, such as e.g. margarine, shortening and low caloriespreads, it is common practise to mix all ingredients and then subject the mixture to cooling and working operations in a series of one or more scrapedsurface heat exchangers and agitated crystallizers. In such processes often heat exchangers and crystallizers of the Votator type are used, e.g. as described in A. J. C. Anderson, Margarine, Pergamon Press Limited, London, 1954, pages 228-229.

BACKGROUND OF THE INVENTION

Heat exchangers of the Votator type (A-units) are often very efficient. However, especially when used to cool relatively viscous compositions, the mechanically generated heat can be so high that it counterbalances the cooling capacity of the heat exchanger, as a result of which no cooling of the composition is obtained. Moreover, the shear forces exerted on such viscous compositions by the A-unit can often be undesirably high.

In the preparation of some products, e.g. margarines and shortenings which are to be used to prepare aerated products, it may be desirable to subject the composition after initial plastification by chilling and working, to a heating step to cause a change in the crystal structure to occur. Best results thusfar were obtained by storing the product at about 27° C. for at least 24 hours, before storing it at ambient temperatures. This is, however, an extremely expensive process due to the necessity of keeping a warehouse at a high temperature and due to the substantial amount of handling that is required to ensure that the products are stored in such a way that a fairly homogeneous heating throughout the product is achieved.

It has been proposed to replace the storage at high temperature by a treatment of the product in a microwave oven at the end of the production line. In such a process, however, frequently pressure problems occur, especially when the composition passing through the oven has a relatively high viscosity. The necessity of using high pressures to pass the composition through the production line may result in unacceptable products.

GENERAL DESCRIPTION

The present invention proves a process for the preparation of an edible plastified fat-containing product wherein a fat-containing composition is passed through a heat exchanger comprising two closely spaced mutually displaceable surfaces, each having a pattern of cavities which overlap during movement of one surface with respect to the other, between which surfaces the composition passes, at least one of which surfaces is provided with means to control the temperature thereof.

The present process is particularly suitable for the preparation of products from compositions which have relatively high viscosities, when entering the heat exchanger. The viscosity of the composition may for example be high due to the presence of substantial amounts of crystallized fat in the composition.

The heat exchanger used in the present process is a dynamic heat exchanger, across which the pressure drop is relatively low and in which the composition passing through it is subjected to relatively low shear forces. The composition passing through the heat exchanger can thus be warmed up or cooled down homogeneously while the amount of mechanically generated heat dissipated in the composition is small and the shear regime to which the composition is subjected is relatively mild. Because of this improved products can be obtained.

The heat exchanger used in the present process comprises two closely spaced, mutually displaceable surfaces, each having a pattern of cavities which overlap during movement of one surface with respect to the other. The material moving between the surfaces traces a path through cavities alternately in each surface.

Preferably, the surfaces of the heat exchanger have patterns of cavities such that a cavity on one of the surfaces continuously overlaps with at least two cavities on the other surface. In the preferred heat exchanger for this process, the cavities are arranged to give constantly available but changing pathways through the device during movement of one surface with respect to the other.

Suitably, the heat exchanger has a cylindrical geometry.

Preferably, the heat exchanger comprises a stator and a rotor; the opposing faces of the stator and rotor carry the cavities through which the material passes during its passage through the device. The external cylinder may be rotatable while the internal cylinder is fixed, but preferably the external cylinder is the stator within which the rotor is journalled.

The heat exchanger may also have a planar geometry in which opposed plane surfaces having patterns of cavities would be moved mutually. Another geometry that can be used is a cone geometry. A mixer of such geometry can comprise a rotor and a stator having shapes of truncated cones. An advantage of a planar or cone geometry is that the distance between the two surfaces can be varied easily. Other geometries can also be suitable, but heat exchangers having a cylindrical geometry are preferred. The rotor may be located eccentrically, but preferably it is placed centrically.

Various configurations can be used for the shape of the cavities. The cavities can, for example, be hemispherical or they can have the shape of a flattened hemisphere. Other shapes that can be used are, for example, half ellipsoids or cylinders having hemispherical closed ends or flattened varieties thereof.

In the International application publication No. WO 83/0322, an extruder is described having a geometry of the above kind. In the publication it is mentioned that this extruder can be used for operations on margarines.

However, no mention is made that the extruder can be used as a heat exchanger.

Preferably both surfaces of the heat exchanger are provided with means for controlling the temperature thereof. Suitably the temperature of one or both surfaces can be controlled by means of a jacket formed by passing heating or cooling medium. For example, the stator and/or the rotor can be provided with double walls between which walls heating or cooling medium passes. As heat exchanging medium liquids such as water or expanding liquidified gasses such as ammonia or Freon can be used. However, other means of controlling the temperature of one or both surfaces, e.g. by heating electrically, can also be used.

The composition used in the present process preferably comprises at least 10% by weight of fat, the balance consisting essentially of material selected from the group consisting of water, protein, gas, emulsifiers, gelling and thickening agents, salt, flavour compounds, colouring matter and mixtures of two or more thereof. Other ingredients e.g. preservatives may, however, also be present in small amounts. Preferably, the composition comprises at least 40 wt % fat.

In this application, by fat is meant, unless indicated otherwise, an edible substance, which may be solid or liquid at ambient temperature, consisting essentially of triglycerides such as, for example, soybean oil, sunflower oil, palm oil, coconut oil, fish oil lard and tallow, which may have been partially or completely hydrogenated or modified otherwise, or comprising nontoxic material having physical properties similar to triglycerides, which material may be indigestible, such as for example waxes, e.g. jojoba oil and hydrogenated jojoba oil, and poly fatty acid esters of mono- and disaccharides, e.g. sucrose octa fatty acid ester, or mixtures thereof.

The mixture leaving the heat exchanger is, according to one preferred embodiment of the invention, a dispersed system having a continuous fat phase containing crystallized fat. The mixture leaving the heat exchanger can be packed immediately, e.g. by filling in tubs, or it can be subjected to further processing before packing it. Products that can thus be obtained are, for example, shortening, butter, margarines, low calorie spreads and melanges. By a low calorie spread is meant a product similar to butter or margarine, i.e. a product having a continuous fat phase and a dispersed aqueous phase and containing crystallized fat, but containing less than about 80% by weight fat. By a melange is meant a product having a continuous fat phase and a dispersed aqueous phase and containing crystallized fat, wherein the fat comprises both butterfat and other fat.

According to a further preferred embodiment of the present invention, the composition is heated in the heat exchanger. Preferably, the composition is cooled to cause crystallization of part of the fat before the composition is passed through the heat exchanger.

It can be advantageous to subject an edible fat-containing composition to a heating treatment. Especially when preparing products, e.g. margarines and shortenings, which are to be used for the preparation of creamy products, it can be advantageous to subject the composition after it has been plastified by chilling and working it, during which treatment usually a substantial amount of crystallized fat is formed, to a heating step to cause partial melting of the fat crystals.

To achieve good results the heating must be carried out under carefully controlled conditions. It is important that the heating is carried out as homogenously as possible. An insufficient degree of homogeneity in the heating of the composition was probably a reason why no good results could be obtained with conventional static heat exchangers. Another problem was that rather high pressures were necessary to pass the composition through the heat exchanger. Such pressure problems also occurred in attempts to prepare cream shortenings with the use of a microwave oven and no good quality products could be obtained. When using a Votator A-unit as heat exchanger to heat the composition, satisfactory results were not obtained either. Presumably, at low shaft speed the heating did not occur sufficiently homogeneously whereas at higher shaft speeds presumably the crystals were broken, resulting in an insufficient growth of large high melting crystals. With the present process these problems can be overcome and good quality products can be obtained.

A reliable indicator for the quality of such products is the Specific Volume (S.V) of the product after whipping it under standard conditions, e.g. for 15 minutes at 20° C. The S.V. of the product as prepared is usually between 1.0 and 1.1 $cm^3/g$ (If the composition contained gas then the specific volume of the product as prepared will be proportionally higher). The S.V. of a good quality product after whipping for 15 minutes at 20° C. will be at least about 3.0 $cm^3/g$.

Preferably, the composition entering the heat exchanger comprises at least 10 wt % of crystallized fat, more preferably it comprises from about 20 to about 40 wt % of crystallized fat. The amount of fat in the composition is preferably in the range of 70 to 100 wt %.

The present process is particularly advantageous for compositions comprising substantial amounts of fish oil. Preferably the composition comprises at least 60 wt % of fat selected from the group consisting of fish oil and hydrogenated fish oil and mixtures thereof.

The temperatures of the composition is preferably raised with 2° to 10° C. in the heat exchanger. The composition leaving the heat exchanger preferably has a temperature of about 26° to about 31° C.

According to another preferred embodiment of the present invention the composition is cooled in the heat exchanger. According to a preferred aspect of this embodiment the composition is cooled to cause crystallization of part of the fat before the composition is passed through the heat exchanger. Preferably the composition entering the heat exchanger comprises a substantial amount of crystallized fat, e.g. 15 wt % or more.

Especially for the preparation of rather firm products with a good texture it can be desirable to cool the composition to very low temperatures without subjecting it to high shear forces. Due to the increasing amount of crystallized fat, however, this is difficult to achieve. In heat exchangers such as a Votator A-unit, when used to cool such viscous compositions, so much heat can be produced by the rotating blades that no net heat removal from the composition takes place. Moreover the shear forces generated in the A-unit when used for such compositions are quite high. When using static heat exchangers for this purpose, rather high pressures will be required and the cooling will take place in a rather inhomogeneous manner.

To obtain a product with a good texture, it is further desirable that the composition is worked during the cooling. The composition should preferably not, however, be subjected to high shear conditions, because this could destroy the microstructure already imparted to the composition to a considerable extent. This requirement can be met by the present process and thus rather firm products with an excellent texture can be prepared.

An additional advantage is that the product leaving the production line can have a lower temperature and can thus be harder, which facilitates the subsequent packing of the product.

The composition entering the heat exchanger according to this aspect of the invention preferably is a dispersed system which comprises a continuous fat phase and a dispersed aqueous phase. The amounts of fat phase and aqueous phase are preferably 40-90 wt % and 60-10 wt % respectively, more preferably 60-85 wt % and 40-15 wt %, respectively.

When preparing margarine, low caloriespreads and the like for use on bread, a need exists to obtain a product having butterlike properties, such as texture and taste.

Furthermore, there is a need to produce butterlike products on the basis of either non-butterfat or of butterfat or mixtures thereof with non-butterfat having a decreased fat content. With conventional churning processes it is very difficult to obtain a good product with fat contents of less than 70 wt. %. For these products it is possible to employ a "Votator" process, but due to the characteristics of votators, this results in a more or less margarine-like product, even if only dairy cream has been used as the starting material.

It is one object of the present invention to provide a process for preparing an edible fat-containing product, which does not have these disadvantages.

This embodiment of the invention is characterized in that an oil in water emulsion of the fat-containing composition in molten state is fed to the cooled heat exchanger, in which the fat-containing composition is cooled to cause crystallization to a solids content of no more than 10 wt. % of the fat phase.

Surprisingly it has been found that with the process of the present embodiment a creamy product can be obtained, which product has a structure comparable to butter.

Important aspects thereof are the specific device used for cooling and the amount of cooling of the molten oil in water emulsion.

The heat exchanger used in the present process is a dynamic heat exchanger, across which the pressure drop is relatively low and in which the composition passing through it is subjected to relatively low, controlled shear forces.

The composition passing through the heat exchanger can thus be cooled down homogeneously while the amount of mechanically generated heat dissipated in the composition is small and the shear regime to which the composition is subjected is relatively mild.

The mixture leaving the device can be a dispersed system having a continuous water phase containing crystallized fat. The mixture leaving the device is preferably packed immediately, e.g. by filling in tubs.

The final product properties are obtained after ageing for some time.

According to another preferred aspect of this embodiment of the invention the composition entering the heat exchanger is a dispersed system having a continuous aqueous phase and a dispersed fat phase. Preferably the composition entering the heat exchanger has a viscosity of at least 0.8 Pa.s. More preferably the composition entering the heat exchanger has a viscosity of 1-20 Pa.s.

During passage of the heat exchanger part of the fat crystallizes and phase inversion occurs which results in a product having a continuous fat phase. The phase inversion need not be complete. For example, the end product may contain aqueous droplets which in turn contain small fat globules. Especially when partial phase inversion occurs and part of the oil-in-water structure of the starting composition is retained a very creamy end product can be obtained.

With the present process excellent melanges can be prepared. This can for example be done by mixing a dairy cream with e.g. a vegetable fat blend such that a viscous oil-in-water emulsion is obtained and then passing the mixture through the heat exchanger.

A product with an excellent texture but containing for example only vegetable fat can be prepared in a similar manner by using instead of a dairy cream a constituted cream containing vegetable fat only.

As starting composition for example also a cream as such can be used. Preferably the composition comprises 45-85 wt % fat.

BRIEF DESCRIPTION OF THE DRAWINGS

Suitable heat exchangers which can be used in the present process will be described with reference to the accompanying diagrammatic drawings in which.

SPECIFIC DESCRIPTION OF DEVICES

Figure 1:
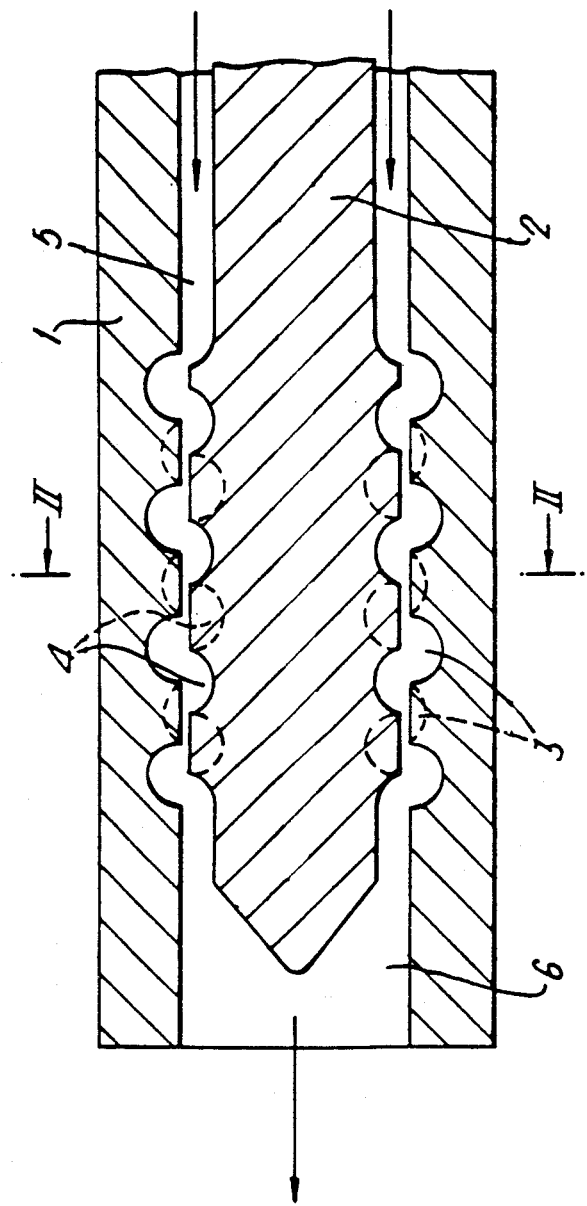
FIG. 1 is a longitudinal section of a heat exchanger with cylindrical geometry.

In FIG. 1 is shown a heat exchanger in longitudinal section. This comprises a hollow cylindrical stator member 1, a cylindrical rotor member 2 journalled for rotation within the stator with a sliding fit, the facing cylindrical surfaces of the rotor and stator carrying respective pluralities of parallel, circumferentially extending rows of cavities which are disposed with:

(a) the cavities in adjacent rows on the stator circumferentially offset;

(b) the cavities in adjacent rows on the rotor circumferentially offset; and (c) the rows of cavities on the stator and rotor axially offset.

Figure 2:
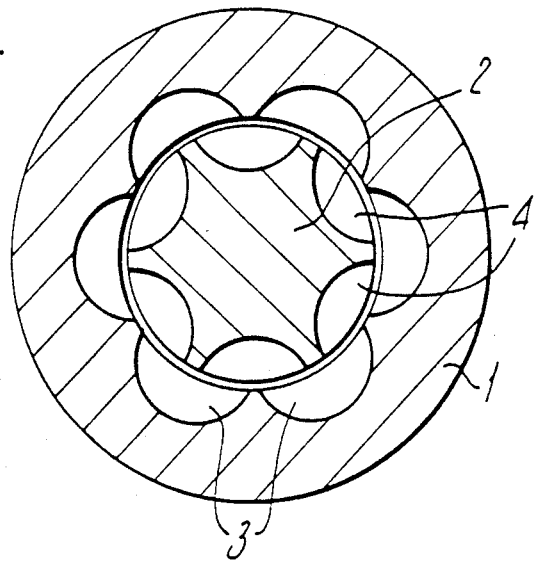
FIG. 2 is a transverse section along the line II—II on FIG. 1.
Figure 3:
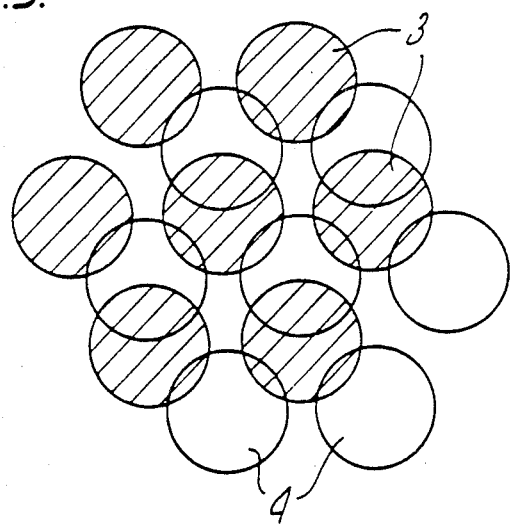
FIG. 3 illustrates the pattern of cavities in the device of FIG. 1.

The pattern of cavities carried on the stator 3 and rotor 4 is illustrated in FIG. 3. The cavities 3 on the stator are shown hatched. The overlap between patterns of cavities 3, 4 is also shown in FIG. 2.

A liquid jacket 1A is provided for the application of temperature control by the passage of a heating or cooling medium. A temperature control conduit is provided in the rotor.

The material passing through the device moves through the cavities alternately on the opposing faces of the stator and rotor. The cavities immediately behind those shown in section are indicated by dotted profiles on FIG. 1 to allow the repeating pattern to be seen.

The material flow is divided between pairs of adjacent cavities on the same rotor or stator face because of the overlapping position of the cavity on the opposite stator or rotor face.

The heat exchanger can, for example, have a rotor radius of 2.5 cm. with 36 hemispherical cavities (radius 0.9 cm) arranged in six rows of six cavities. The internal surface of the stator can carry e.g. seven rows of six cavities to provide cavity overlap at the entry and exit. The material to be heated or cooled is injected into the device through channel 5, which communicates with the annular space between the rotor and stator. The material leaves the device through exit 6.

Figure 4:
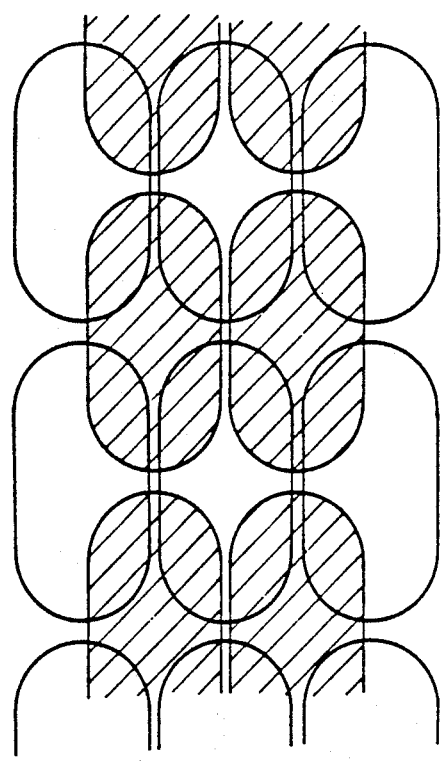
FIG. 4, 5 and 6 illustrate other patterns of cavities.

FIG. 4 shows elongate cavities arranged in a square pattern; these cavities have the sectional profile of FIG. 2. These cavities are aligned with their longitudinal axis parallel to the longitudinal axis of the device and the direction of movement of material through the device; the latter is indicated by the arrow.

Figure 5:
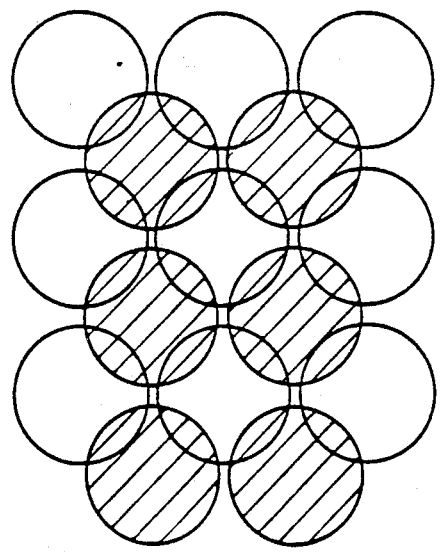

FIG. 5 shows a pattern of cavities having the dimensions and profile of those shown in FIGS. 1, 2 and 3. The cavities of FIG. 5 are arranged in a square pattern with each cavity being closely spaced from flow adjacent cavities on the same surface. This pattern does not provide as high a degree of overlap as given by the pattern of FIG. 3. The latter has each cavity closely spaced to six cavities on the same surface, in a hexagonal pattern.

Figure 6:
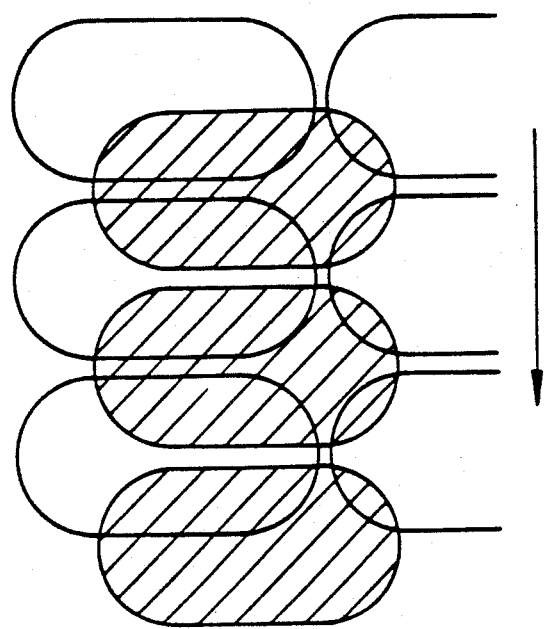

FIG. 6 shows a pattern of cavities wherein the cavities on the rotor, shown hatched, and stator have a larger dimension normal to the material flow; the latter is indicated by an arrow. The cavities are thus elongate. This embodiment can provide a lower pressure drop over its length compared with devices of similar geometry but not having cavities positioned with a longer dimension normal, i.e. perpendicular to the material flow. To obtain a reduction in pressure drop, at least one of the surfaces must carry elongate cavities having their longer dimension normal to the material flow.

EXAMPLES

EXAMPLE 1

A cream shortening was prepared from a fatblend which consisted of a mixture of fish oils which had been hydrogenated to different extents. After stabilization at 20° C., the amount of crystallized fat in the fatblend was 30 wt %. The solids content was determined by NMR, as described in "Fette, Seifen, Anstrichmittel", 80 (1978), 180–186.

4 parts by volume of the fatblend were mixed with 1 part by volume of nitrogen in a premix vessel. The mixture was heated to 50° C. and then plastified at a capacity of 30 kg/h, by passing it through two scraped surface heat exchangers of the Votator type (A-units). The mixture leaving the second A-unit had a temperature of 7° C. The mixture was then passed through an agitated crystallizer of the Votator type (C-unit) The mixture left the C-unit at a temperature of 22° C. The solids content of the mixture was 25 wt %. It was subsequently passed through a heated static mixer. The temperature rise in the static mixer was 5° C. and the solids content of the composition leaving the static mixer was 16 wt %. The composition was then passed through a heat exchanger of the type shown in FIG. 1. The diameters of the stator and rotor of the heat exchanger were 28 mm and 27.7 mm respectively, providing an annulus of 0.15 mm. The number of cavities on the stator was 72 and on the rotor 84. Each cavity had a diameter of 12 mm and a depth of 4 mm. The volume of the heat exchanger was 100 ml. The heat exchanger was operated at a rotor speed of 500 rpm. The stator was heated to provide a surface temperature of about 34° C.

The temperature of the composition leaving the heat exchanger had risen to 29° C.; the solids content was 10 wt %. The product leaving the heat exchanger was packed.

After one week storage at 20° C., the hardness and the cream specific volume were determined.

The hardness was measured with a cone penetrometer as described in J.A.O.C.S. 36, (1959), 345–348 (C-value) at 20° C. The C-value was 210 g/cm$^2$.

The cream specific volume (S.V.) was measured by determining the volume per gram shortening, after whipping it for 15 minutes at 20° C. The S.V. value was 3.32 cm$^3$/g.

Comparison A:

Example 1 was repeated without using the heat exchanger according to the invention. The product leaving the static mixer was packed. It was unacceptably inhomogeneous.

Comparison B:

Example 1 was repeated without using the static mixer and the subsequent heat exchanger. The product leaving the C-unit was packed. It was stored for 24 hours at 27° C. before the storage at 20° C.

A good quality product was obtained, having a C-value of 270 g/cm$^2$ and an S.V. value of 3.27 cm$^3$/g.

Comparison C:

Comparison B was repeated without the storage at 27° C.

A rather firm product with an unacceptably low cream specific volume was obtained; $C_{20}=440$ g/cm$^2$, $S.V._{20}=2.80$ cm$^3$/g.

EXAMPLE 2

Example 1 was repeated several times but the following process conditions were varied:
capacity at 30 kg/h and 60 kg/h
rotor speed of the heat exchanger in the range of 100–1500 rpm
replacement of the static mixer and the subsequent heat exchanger by a single heat exchanger as described in Example 1, but being 1.5 times as long and having the surfaces of both the stator and the rotor heated to a temperature of about 34° C.

Good quality cream margarines were obtained having $C_{20}$-values after 1 week storage in the range of 180–250 g/cm$^2$ and $S.V._{20}$-values in the range of 3.25–3.40 cm$^3$/g.

EXAMPLE 3

A margarine was prepared from a composition containing the following ingredients:
42 wt % soybean oil
37 wt % hydrogenated soyabean oil (slip melting point 34° C.)
5 wt % hydrogenated palm oil (smp 43° C.)
0.25 wt % emulsifier
0.1 wt % β-carotene solution
5 wt % soured skimmed milk
0.1 wt % salts
0.1 wt % preservative
11 wt % water.

The composition was homogenized in a premix vessel at 44° C. and passed through an A-unit, a C-unit and another A-unit.

The pressure before the first A-unit was 9 bar, absolute. The process was carried out at a capacity of 4.1 kg/h.

The temperature of and the amount of crystallized fat in the composition after the second A-unit were 7.5° C. and 23.2 wt %.

The mixture was subsequently passed through a heat exchanger similar to the one described in example 1, but which was somewhat smaller (same diameters of rotor and stator and same cavities patterns, but with 36 cavities on the stator, 42 cavities on the rotor and a volume of 50 ml). The rotor speed was 200 rpm. The surface of the stator was kept at a temperature of −20° C.

The temperature of the product leaving the heat exchanger was 6° C. The product contained 29 wt % crystallized fat. The product leaving the heat exchanger was packed.

The plasticity of the product was excellent. The hardness (C-value) of the product at 10°, 15° and 20° C. was 3930, 1980 and 375 g/cm² respectively.

For comparison the example was repeated without cooling the stator of the heat exchanger. The product emerging from the device had a temperature of 17° C. and a solids content of 17.2 wt %. It was substantially less plastic than in Example 3.

EXAMPLE 4

A melange containing 27 wt % butterfat and 29 wt % vegetable fat was prepared by first preparing an oil-in-water emulsion and then causing fat crystallization and phase inversion to occur by passing the emulsion through a chilled heat exchanger according to the invention. The process was carried out as follows:

A fatblend was prepared by mixing the following ingredients:
- 49 wt % soybean oil
- 43 wt % hydrogenated soybean oil (smp 34° C.)
- 6 wt % hydrogenated palm oil (smp 43° C.)
- 1.7 wt % emulsifiers
- 0.3 wt % colouring matter and flavouring compounds.

98 wt % dairy cream containing 40 wt % butterfat was mixed with 2 wt % salt.

7 parts by weight of the salted dairy cream and 3 parts by weight of the fat blend were continuously mixed at a total capacity of 2.2 kg/h were mixed in a dynamic mixer. (C-unit)

The composition left the mixer at a temperature of about 30° C.; it had a continuous aqueous phase. The viscosity of the composition was about 1.5 Pa.s.

The mixture was then passed through a heat exchanger according to the invention as described in Example 1. The surface of the stator was kept at −20° C. The rotor speed was 700 rpm. In the heat exchanger phase inversion occurred and the fat continuous product leaving the heat exchanger was packed. It contained 10 wt % of crystallized fat and it had a temperature of 4° C. The product was then stored for 3 days at 10° C.

An excellent product was obtained with very good, butterlike texture and appearance, and excellent oral melt properties. The product had a better spreadability than butter (C-value at 10° C.: 1700 g/cm²salt release (T100=temperature at which the emulsion is completely destabilized): 31.4° C.).

EXAMPLE 5

Example 4 was repeated, but 6 parts by weight of cream were mixed with 4 parts by weight of the fatblend.

A very good product was obtained with a $C_{10}$ value of 1070 g/cm² and a Salt Release (T100) of 30.9° C.

EXAMPLE 6

A product containing 80 wt % fat was prepared in a manner similar as described in example 4, but it contained only vegetable fat.

The composition of the fatblend used was the same as in example 4.

A cream was constituted from the following ingredients:
- 60 wt % vegetable fatblend of the same composition as described in example 4
- 33 wt % water
- 7 wt % other cream components 1 part by weight of cream was continuously mixed with 1 part by weight of the fatblend at a total capacity of 2.0 kg/h and 50° C. by passing it through a C-unit and an A-unit (no cooling). The product leaving the A-unit had a viscosity of about 1.7 Pas. It was an emulsion having a continuous aqueous phase.

The emulsion was then passed through a heat exchanger as described in example 4. The surface of the stator was kept at −20° C. The rotor speed was 500 rpm.

The product leaving the heat exchanger was packed. It had a continuous fatphase. After 2 minutes the solids content of the product was 35 wt %.

A product with an excellent butterlike texture was obtained.

The C-values at 5° and 20° C. were 1050 and 240 g/cm², respectively.

EXAMPLE 7

A product containing 80 wt. % fat was prepared on the basis of a fat blend having the following composition: ($N_5=22$, $N_{10}=19$, $N_{20}=7,5$) 35 wt. % hardened fish oil (smp. 37° C.) 65 wt. % soy bean oil.

A cream was prepared from said fat blend and an aqueous phase having the same composition described in Example 6. The obtained oil in water emulsion was passed through the cooled heat exchanger described in Example 4 at a rate of 4.5 kg/h, wherein in a series of tests the cooling was adjusted to obtain various solid contents, immediately after leaving the heat exchanger. This product was packed without further treatment. The properties of the products are given in the following table, after storage for at least two weeks.

TABLE

| | Solids % : | | | |
|---|---|---|---|---|
| | 7.3 | 8.5 | 8.9 | 11.4 |
| C5 | 800 | 720 | 630 | 570 |
| C10 | 720 | 610 | 440 | 280 |
| C15 | 510 | 390 | 210 | 200 |
| C20 | 120 | 60 | 40 | 55 |
| C5, cycled | 570 | 670 | 440 | 370 |
| C15, cycled | 125 | 85 | 70 | 70 |
| C20, cycled | 60 | 60 | <40 | <40 |

EXAMPLE 8

In the same manner as in Example 7 a 80 wt. % fat product was prepared from a fat blend having $N_5=16$, $N_{10}=14$ and $N_{20}=6,5$.

The results are given in the table.

TABLE

| | % Solids: | | | |
|---|---|---|---|---|
| | 3.5 | 4.9 | 5.9 | 7.2 |
| C5 | 330 | 310 | 230 | 205 |

TABLE-continued

|  | % Solids: | | | |
|---|---|---|---|---|
|  | 3.5 | 4.9 | 5.9 | 7.2 |
| C20 | 180 | 160 | 140 | 110 |
| C5, cycled | 285 | 285 | 230 | 245 |
| C20, cycled | 135 | 115 | 110 | 100 |

EXAMPLE 9

The composition of Example 8 was prepared as a cream and without treatment in crystallizer or votator passed through the cooled heat exchanger. The results are given in the table.

TABLE

|  | % Solids 6.8 |
|---|---|
| C5 | 510 |
| C10 | 500 |
| C20 | 150 |
| C5, cycled | 285 |
| C20, cycled | 140 |

EXAMPLE 10

Example 8 was repeated using the same components, with this exception, that the fat phase/aqueous phase ratio was adjusted to obtain a 60 wt. % fat-containing product.

The results are given in the table.

TABLE

|  | Solids % | | |
|---|---|---|---|
|  | 4.7 | 5.4 | 6.7 |
| C5 | 290 | 260 | 215 |
| C20 | 150 | 150 | 130 |
| C5, cycled | 250 | 230 | 220 |
| C20, cycled | 135 | 110 | 100 |

EXAMPLE 11

A number of products containing 65 wt. % of fat, were prepared using different fat blends, by preparing an artificial cream containing 50 wt. % fat, 2 wt. % sodiumcaseinate and 0.6 wt. % thickener, of which cream 70 wt. parts were mixed with 30 wt. parts fat blend, to yield the composition indicated in the table.

After mixing the liquids in a crystallizer at 1500 rpm the oil-in-water emulsion, having a temperature of 45° C. is fed to a heat exchanger having a rotor speed of 500 rpm as described in Example 1, wherein the emulsion was cooled to 13.5° C.

The emulsion was then filled in tubs and stored. After storage the properties were determined. For comparison, the properties of conventional butter are also given.

TABLE

| Example | 11 | 12 | 13 | Butter |
|---|---|---|---|---|
| Fat blend in % | 50 butterfat | 100 tallow oleine | 100 hardened vegetable | — |
| Properties |  |  |  |  |
| C5 | 1170 | 2400 | 920 | 1740 |
| CT5 | 1210 | 2350 | 960 | 1930 |
| C20 | 265 | 490 | 270 | 400 |
| CT20 | 330 | 445 | 315 | 435 |

TABLE-continued

| Example | 11 | 12 | 13 | Butter |
|---|---|---|---|---|
| Score* | 8/8.1 | 8 | 7.5/7.5 | 8/8.1 |

*The "score" was determined by a panel. Properties before and after cycling (5-20° C.) are separated from each other with a "/".

It is clear that with the process of this example one can obtain a product that comes quite close to butter. For comparison, an ordinary margarine has a score of 3-4.

EXAMPLES 14-16

In the same manner as in Examples 11-13 using the fat blend of Example 13, a 68 wt. % fat product is prepared at a throughput of 6-8 kg/h. The artificial cream had a viscosity of 1.7 Poise. After mixing the viscosity was 5.4 Poise. This oil-in-water emulsion was fed to the heat-exchanger wherein, by applying different amounts of cooling different packing temperatures were obtained. The results are given in the table.

TABLE*

| Example | 14 | 15 | 16 |
|---|---|---|---|
| Temperature** | 14 | 9 | 6 |
| % solids** | 0 | 6 | 9.5 |
| C5 | 990/775 | 490/500 | 620/385 |
| C20 | 290/265 | 210/140 | 120/110 |
| Score | 7.5/7 | 8/7 | 6/4 |

*see footnote table examples 14-16
**of product immediately after heat exchanger.

EXAMPLE 17

In a device as described in Example 1, 80 kg/h of a fat blend containing 80 wt. % fat, having a temperature of 20.7° C. and a solid fat content of 21% was introduced. The fat was composed of 70 wt. % hardened fish oil and 30 wt. % soy bean oil. The temperature of the heat transfer liquid was varied from 27° to 33° C., as well as the rotor speed. The results of the experiments are given in the table.

TABLE

| Heat transfer liquid (temperature) °C.) | Rotor speed (rpm) | | | | | | | |
|---|---|---|---|---|---|---|---|---|
|  | 500 | | | | 200 | | | |
|  | Δp (bar) | T2 °C. | SFC % | C20 | Δp | T2 | SFC | C20 |
| 33 | 1.5 | 33.2 | 7.9 | 370 | 0.5 | 33.4 | 5.6 | 380 |
| 30 | 2.5 | 30.8 | 11.4 | 300 | 2.5 | 31.7 | 9.4 | 405 |
| 27 | 4.0 | 28.3 | 13.8 | 350 | 3.5 | 29.6 | 12.8 | 380 |

Δp denotes the pressure drop over the heat transfer device, the total line pressure amounting to Δp + 4 bar.
T2 is the temperature of the product leaving the device.
SFC is the solid fat content of the fat in the fat blend.
C20 is the hardness at 20° C.

All products obtained in the above experiments had exceptionally good cake/cream volumes, thus making them very suitable as cake and cream margarines.

We claim:

1. Process for the preparation of an edible plastified fat-containing product comprising heatexchanging a composition comprising at least 10 wt. % fat wherein the balance of the composition comprises material selected from the group consisting of water, gas, protein, additional fat, and mixtures thereof by passing the composition through a heat-exchanger comprising two closely spaced mutually displaceable surfaces, each having a pattern of cavities which overlap during movement of one surface with respect to the other, between which surfaces the composition passes, at least one of which surfaces is provided with means to control the temperature thereof, thereby substantially, simultaneously and homogeneously shearing and heating or shearing and cooling said composition to control the change in crystal structure thereof to produce said product.

2. Process according to claim 1, wherein both surfaces are provided with means for controlling the temperature thereof.

3. Process according to claim 1, wherein each cavity on one of the surfaces continuously overlaps with at least two cavities on the other surface.

4. Process according to claim 1, wherein the surfaces are rotor and stator surfaces.

5. Process according to claim 1, wherein the composition leaving the heat-exchanger is a dispersed system having a continuous fatphase and containing crystallized fat.

6. Process according to claim 1, wherein the composition additionally comprises material selected from the group consisting of emulsifiers, gelling and thickening agents, salt, flavoring compounds, coloring matter and mixtures thereof.

7. Process according to claim 1, wherein the composition comprises at least 40 wt. % fat.

8. Process according to claim 1, further comprising heating the composition in the heat exchanger by maintaining at least one of the displaceable surfaces at a temperature greater than that of the composition entering the heat exchanger.

9. Process according to claim 8, comprising cooling the composition to cause crystallization of part of the fat before passing the composition through the heat exchanger.

10. Process according to claim 9, wherein the composition entering the heat-exchanger comprises at least 10 wt. % crystallized fat.

11. Process according to claim 8, wherein the composition comprises 70 to 100 wt. % fat.

12. Process according to claim 8, wherein the composition comprises at least 60 wt. % of fat selected from the group consisting of fish oil, hydrogenated fish oil and mixtures thereof.

13. Process according to claim 8, comprising raising the temperature of the composition by from 2° to 10° C. by passing the composition through the heat-exchanger.

14. Process according to claim 8, wherein the composition leaving the heat exchanger has a temperature of about 26° to about 31° C.

15. Process according to claim 1, further comprising cooling the composition in the heat-exchanger by maintaining at least one of the displaceable surfaces at a temperature less than that of the composition entering the heat-exchanger.

16. Process according to claim 15, comprising cooling the composition to cause crystallization of part of the fat before passing the composition through the heat-exchanger.

17. Process according to claim 16, wherein the composition entering the heat-exchanger comprises at least 15 wt. % crystallized fat.

18. Process according to claim 15, wherein the composition entering the heat-exchanger is a dispersed system comprising a continuous fat phase and a dispersed aqueous phase.

19. Process according to claim 15, wherein the composition comprises from 60 to 90 wt. % fat phase and from 40 to 10 wt. % aqueous phase.

20. Process according to claim 15, wherein the composition entering the heat-exchanger is a dispersed system having a continuous aqueous phase and a dispersed fat phase.

21. Process according to claim 20, wherein the composition entering the heat-exchanger has a viscosity of at least 0.8 Pa.s.

22. Process according to claim 21 wherein the composition entering the heat exchanger has a viscosity of 1–20 Pa.s.

23. Process according to claim 20, wherein the composition comprises from 45 to 85 wt % fat.

24. Process according to claim 15 comprising cooling the fat-containing product to cause crystallization to a solids content of not more than 10 wt. % of the fat.

25. Process according to claim 24, comprising cooling the fat-containing product to a degree of crystallization of between 5 and 9 wt. % of the fat.

* * * * *